Feb. 14, 1928.
W. SIEBERT
SOLDERING IRON
Filed Oct. 20, 1926
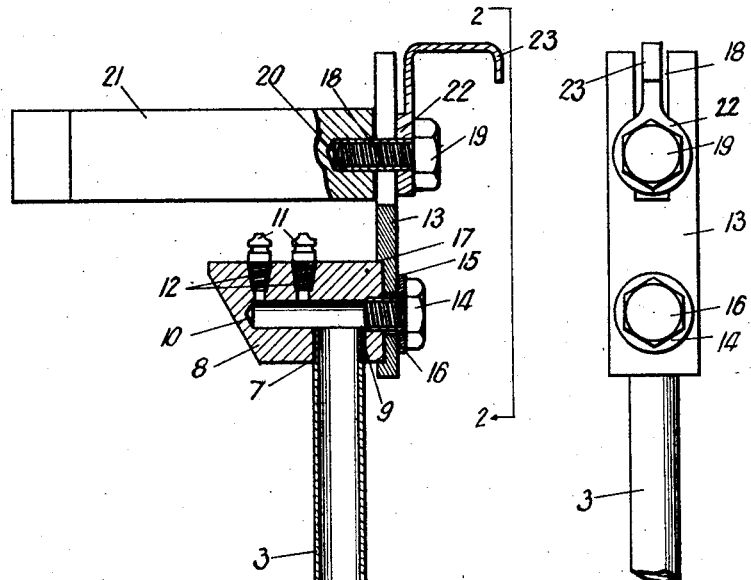
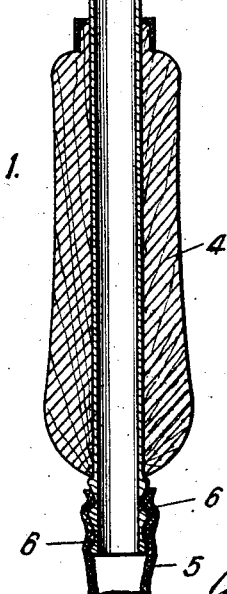

Patented Feb. 14, 1928.

1,658,947

UNITED STATES PATENT OFFICE.

WILLY SIEBERT, OF CHICAGO, ILLINOIS.

SOLDERING IRON.

Application filed October 20, 1926. Serial No. 142,845.

The invention relates to tools commonly known under the name of soldering irons, and the object of the invention is to provide a soldering iron constructed in such a manner that the tool may be directly connected with a pipe which in turn is connected to a source of fluid fuel, for instance gas.

In the drawings accompanying the following specifications and forming a part thereof, Fig. 1 is a side view of the soldering iron according to the present invention, the major part of said view being shown in section; and Fig. 2 is a view of Fig. 1 taken on line 2—2 of Fig. 1.

The drawings illustrate a preferred embodiment of the invention; it is however to be noted that the invention is not to be restricted and limited to the exact construction shown in said drawings and described in the specification, but that such changes and alterations may be made as fall into the scope of the claims appended hereto without violating the spirit of the invention.

A pipe 3 adapted to conduct a fluid fuel, such as gas, carries adjacent its one end a hollow handle 4. Said handle may be made of wood or any other suitable material. The end of the pipe adajacent which the handle is arranged extends beyond the handle and is adapted to receive a flexible conduit for the fluid fuel. Said conduit may consist of a rubber hose 5 or the like. In order to hold the rubber hose in position the portion of pipe 3 extending beyond the handle 4 may be roughened or provided with knobby places as indicated at 6. The other end of pipe 3 is threaded as shown at 7. A nozzle block 8 is provided with a tapped hole adapted to receive the threaded end of the pipe 3. The nozzle block 8 has a bore extending at right angles to the tapped hole 9, said hole communicating with said bore. One or more nozzles 11 are inserted in bores 12 provided therefor in the nozzle block and communicate with the bore 10 of said block. A holder plate 13 is removably fastened to the nozzle block 8. The open end of the bore 10 of the block is tapped. A screw bolt 14 extends through a hole 15 provided for this purpose in the holder plate 13 and is screwed into the tapped portion of the bore 10. A washer 16 may be arranged between the head of bolt 14 and plate 13. In order to prevent an accidental pivoting of the holder plate 13 about the axis of the bolt 14 the plate is provided with a groove 17, the nozzle block 8 snugly fitting into said groove.

From the free end of the holder plate 13 a slot 18 extends longitudinally of said plate for some distance into said plate. A bolt 19 is screwed into a tapped hole 20 provided in the top end of a soldering iron 21 and extends through the slot 18 to hold the soldering iron in position on said holder plate. A washer plate 22 is arranged between the head of the bolt 19 and the holder plate 13 and has a hook shaped portion 23.

When the gas is turned on it flows through the flexible conduit 5, the pipe 3, the tapped hole 9, bore 10, and bores 12 to the nozzles 11. Here the gas may be ignited and the flames will quickly heat the soldering iron 21. The hook shaped portion 23 of the washer plate 22 serves for hanging up the tool when it is not in use.

What I claim is new and desire to secure by Letters Patent is:

1. In a soldering iron of the class described a hollow stem, a handle fastened to the stem adjacent the one end thereof and surrounding the stem, a nozzle block, having a longitudinal bore therein, a plurality of nozzles arranged in said block, said nozzles communicating with the bore of the block and adapted to be removed without removing any other part and said bore communicating with the interior of the hollow stem, and a holder plate removably fastened to the nozzle block and carrying the soldering head, said hollow stem being adapted to be connected to a source of fluid fuel and said nozzles being adapted to direct the flame of the ignited fuel against the soldering head.

2. In a soldering iron of the class described a hollow stem adapted to be connected to a source of fluid fuel, a handle surrounding a portion of said stem adjacent the one end thereof, a nozzle block fastened to the other end of said stem, said block being provided with a bore, one end of said bore being closed, a plurality of nozzles inserted in said block arranged lengthwise of the soldering and communicating with the bore, said bore being in communication with the interior of the stem, a holder plate, and means for removably fastening the holder plate to said block, said means at the same time closing the open end of the bore of the nozzle block, and said plate removably holding the soldering head.

In witness whereof I have affixed hereunto my signature.

WILLY SIEBERT.